Oct. 27, 1936.　　　A. PATZIG　　　2,058,618

TORSION ROD FASTENING

Filed Aug. 5, 1935

Inventor
Alfred Patzig

By Blackmore, Spencer & Flint
Attorneys

Patented Oct. 27, 1936

2,058,618

UNITED STATES PATENT OFFICE 2,058,618

TORSION ROD FASTENING

Alfred Patzig, Russelsheim-on-the-Main, Germany, assignor to General Motors Corporation, Detroit, Mich., a corporation of Delaware Application August 5, 1935, Serial No. 34,803
In Germany March 25, 1935

8 Claims. (Cl. 287—20)

This invention relates to means of rigidly attaching members such as brackets or arms to shafts which are subjected to torsional stresses applied through the said members.

In particular, the invention is concerned with the fitting of brackets and arms or the like, to torsional rod springs of a type adapted for use in vehicles as torsional spring systems. It relates specifically to the type of fastening shown in copending application, S. N. 12,847, now a patent, No. 2,016,753, and to a means of improving the connections therein described.

As set forth in the patent application, S. N. 12,847, it is desirable to effect a connection between the rotary bar spring and the sleeve portion of a bracket or arm attached thereto, in such a way that the resistance of the bar to fatigue from repeated oscillations, is not reduced.

According to the patent application, S. N. 12,847, members such as arms or brackets, gears or the like, are attached to a rotary rod or shaft by means of a shrinking or force fit of such a character that the sleeve connection grips the rod most tightly at fitted points of the connection most removed, axially of the rod, from any other applied torsional force, and less tightly at fitted places of the connection approaching such applied torsional force, the rod being throughout its working length, of practically unchanging cross section and surface structure.

The surface pressure by which the sleeve connection grips the rod, and which is the shrinking or force fit pressure, is reduced where the torsional stress on the spring would otherwise be a maximum, by reducing the diametral difference between the rod and the bore of the sleeve connection at this point, i. e., either by tapering the rod or the bore of the sleeve connection. Alternatively, the same effect may be obtained by tapering the outer diameter or periphery of the sleeve portion of the member to a smaller diameter towards the point where the torsional stress on the spring would otherwise be a maximum. Any or all of the foregoing means for varying the surface pressure between the connected parts, axially of the rod, may be used separately or together, while the pressure resulting from the diametral difference, and required for connecting the rod and the sleeve portion of the member, can be reduced by interposing hardened products of combustion between the rod and the hole in any such part. Furthermore, any suitable additional positive attaching means may be used if desired, between the rod and the member attached thereto, adjacent to the point at which the surface pressure between the rod and the member is greatest, (i. e., at the place most removed from the working portion of the rod).

The object of the present invention is to still further improve a connection or fastening of the above described kind.

According to the invention, the ability of the rod to resist fatigue at the connection from repeated oscillations, is improved by providing a bushing of softer material, such as copper, between the rod and the bore of the sleeve, towards that end of the latter at which the surface pressure or the grip on the rod is least. This can best be effected by pressing the copper bushing into the sleeve before shrinking or pressing the sleeve onto the rod. Such a copper bushing has been found to prevent destruction of the surface of the rod, and fatigue failure at that part of the connection nearest a working portion of the rod.

It is known that in all cases in which torque arms or brackets are connected to rods or shafts subjected to torsional stresses applied through such members which have been attached to the rod by means of a shrinking or clamping connection, there occur relative movements of the sleeve and rod which are of molecular magnitude and greater at that end of the sleeve towards a working part of the rod, and which cannot be perceived by ordinary means. The rubbing of steel on steel which occurs in such circumstances, results in a so-called bleeding of the material at the point of connection, particularly, when air is admitted at the place of relative movement. An oxidation process occurs, in which the oxide, as a result of the friction, is separated in the form of a red powder, thus giving rise to the term "bleeding". Such a bleeding and consequent weakening of the rod or shaft, can be prevented by the use of a copper bushing or liner, extending through that part of the connection where the greater degree of relative movement occurs. It has been found that the copper exercises a lubricating function which prevents oxidation. The bushing preferably extends over a portion of the rod outside the sleeve, in order to protect the stressed surface in the neighborhood of the connection, to the outside thereof, as well as to the inside.

In actual practical tests it has been found that such a copper liner in the connection, increases tenfold the number of torsional oscillations, of one part of the rod relatively to another part connected to an arm or bracket in the aforementioned manner, which can be withstood by the rod before fatigue failure at the connection, other things being equal.

It will be appreciated that the "lubrication" provided by the copper between the rod and the sleeve could be provided by various other materials or metals softer than the steel, or the like, of the rod and the sleeve, although copper has been found most effective in the case of steel torsion rods and sleeves.

The drawing shows three forms of construction of a fastening or connection, according to the invention.

Figure 3:
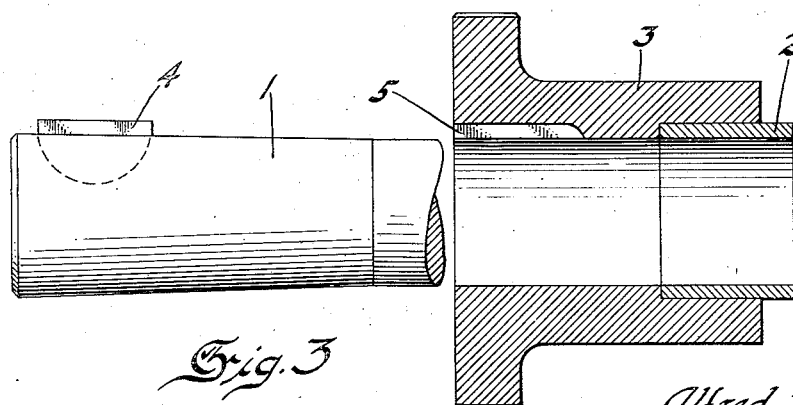

Figure 3 shows a construction in which the varying surface pressure or grip of the sleeve on the rod, axially of its length, is obtained by a shrinking or force fit in which the rod is tapered to a greater diameter in that part of the sleeve connection more remote from the stressed portion of the rod. The use of positive additional means adjacent to the point at which the surface pressure between the rod and the member is greatest, is also shown.

In all the drawings (1) is the rod or shaft; (2) is the copper bushing or liner, (3) is the sleeve portion of a member attached to the rod.

In Figure 3, an additional positive fastening means is provided by the key 4 in the rod, and the groove 5 in the sleeve.

Figure 1:
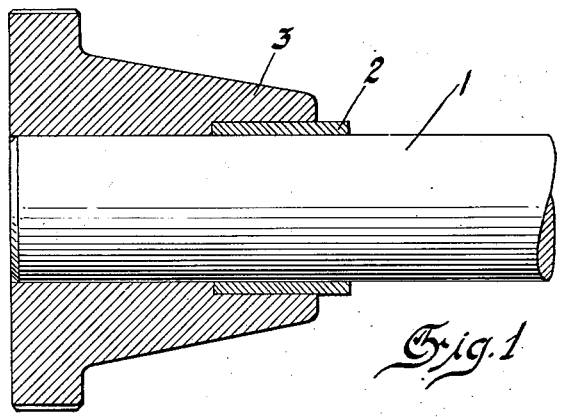
Figure 1 shows a rod of unvarying diameter throughout its length, in which the varying surface pressure or grip of the sleeve on the rod, axially of its length, is provided by reducing the outside diameter of the sleeve connection towards the working portion of the rod.
Figure 2:
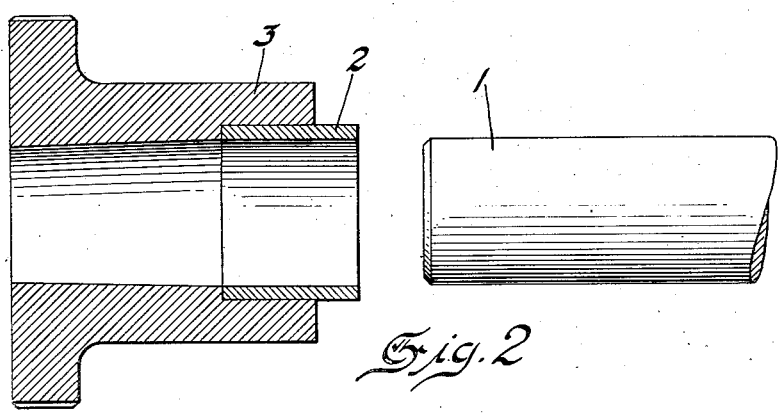
Figure 2 shows a construction in which the same effect is obtained by tapering the bore of the sleeve portion to a smaller diameter in that part of the connection more remote from the stressed portion of the rod; the outer dimension of the sleeve portion being constant throughout its length. (The taper of the bore is shown to an exaggerated degree in the drawing for the sake of clarity.)

The means providing the grip of varying surface pressure, according to Figures 1, 2 and 3, may obviously be used separately or together in any combination in which also, any suitable additional positive connecting means may be used or not, as may be desired.

I claim:

1. In combination, a shaft and a member through which stresses are applied to the shaft, said member being provided with a sleeve portion embracing the shaft, a bushing in that end of the sleeve portion towards a working portion of the shaft, the material of said bushing being softer than the material of the shaft and the sleeve portion, the relative dimensions of the shaft and the sleeve portion with its bushing varying axially of the shaft, whereby the sleeve portion grips the shaft with a surface pressure which decreases to a minimum in that end of the sleeve towards the working portion of the shaft, from a maximum value in a portion of the sleeve farther removed therefrom.

2. The combination, according to claim 1, in which the shaft and a member through which stresses are applied to the shaft, are of steel, while the bushing in the sleeve portion of the member is of copper.

3. The combination, according to claim 1, in which the bushing in the sleeve portion of the member through which stresses are applied to the shaft, extends over the working portion of the shaft adjacent to, and outside the sleeve.

4. The combination, according to claim 1, in which the sleeve portion has a normal internal diameter which is greatest adjacent a working portion of the shaft and decreases towards a portion of the sleeve farther removed therefrom.

5. The combination, according to claim 1, in which the sleeve portion has an outer periphery tapering from a maximum to a minimum, towards a working portion of the shaft.

6. The combination, according to claim 1, in which the normal diameter, of that portion of the shaft within the sleeve portion, is least adjacent a working portion of the shaft and increases towards a portion of the sleeve farther removed therefrom.

7. In combination, a steel shaft constituting a torsion rod spring, and a member of steel through which torsional forces are applied to the shaft, said member being provided with a sleeve portion embracing the shaft, and a copper bushing in that end of the sleeve portion towards a working portion of the shaft, the relative dimensions of the shaft and the sleeve portion with its bushing varying axially of the shaft, whereby the sleeve portion grips the shaft with a surface pressure which decreases to a minimum in that end of the sleeve towards the working portion of the shaft, from a maximum value in a portion of the sleeve farther removed therefrom.

8. In combination, a shaft and a member through which torsional forces are applied to the shaft, said member being connected to the shaft by a sleeve portion embracing the shaft, the relative dimensions of the shaft and the sleeve portion varying axially of the shaft, whereby the sleeve portion grips the shaft with a surface pressure which decreases to a minimum in that end of the sleeve towards a working portion of the shaft, from a maximum value in a portion of the sleeve farther removed therefrom, and means, in that end of the sleeve connection towards the working portion of the shaft, protecting and by its lubricating action preventing destruction of the surface of the rod and the consequent fatigue failure in that part of the sleeve connection at which a degree of relative movement between the shaft and the sleeve takes place, said means consisting of a bushing of material softer than the material of the shaft and the sleeve portion.

ALFRED PATZIG.